United States Patent
Lyons

(10) Patent No.: US 6,425,676 B1
(45) Date of Patent: Jul. 30, 2002

(54) ILLUMINATED EXTERIOR RAILING SYSTEMS

(76) Inventor: Martin G. Lyons, 9100 E. Marginal Way, Seattle, WA (US) 98108

( * ) Notice: Subject to any disclaimer, the term of this patent is extended or adjusted under 35 U.S.C. 154(b) by 0 days.

(21) Appl. No.: 09/397,283

(22) Filed: Sep. 16, 1999

(51) Int. Cl.$^7$ ............................................. F21S 8/00
(52) U.S. Cl. ........................ 362/152; 362/146; 362/240
(58) Field of Search ..................... 362/31, 146, 576, 362/152, 240; 256/10, 59, 64, 73

(56) References Cited

U.S. PATENT DOCUMENTS

| | | | |
|---|---|---|---|
| 3,067,991 A | | 10/1962 | Grenadier |
| 3,131,871 A | | 5/1964 | Foulds |
| 3,448,257 A | * | 6/1969 | Sacket, Jr. .................. 362/158 |
| 3,544,782 A | * | 12/1970 | Hahn ......................... 362/152 |
| 3,740,541 A | | 6/1973 | Conradt |
| 4,143,411 A | * | 3/1979 | Roberts ...................... 362/145 |
| 4,161,769 A | | 7/1979 | Elliott ........................ 362/146 |
| 4,896,759 A | * | 1/1990 | Badstuebner et al. ....... 198/335 |
| 5,040,659 A | * | 8/1991 | Saito et al. ................. 198/335 |
| 5,067,062 A | * | 11/1991 | Rulke ......................... 362/146 |
| 5,170,746 A | * | 12/1992 | Roose ......................... 256/73 |
| 5,339,228 A | * | 8/1994 | Baethge et al. ............. 362/146 |
| 5,410,458 A | * | 4/1995 | Bell ............................ 362/240 |
| 5,555,654 A | | 9/1996 | Hermann ..................... 362/31 |
| 5,613,758 A | | 3/1997 | Kamschal et al. .......... 362/146 |
| 5,636,914 A | | 6/1997 | Trusiani ...................... 362/31 |
| 5,641,241 A | | 6/1997 | Rushing ..................... 362/152 |
| 5,701,236 A | | 12/1997 | Viviano ...................... 362/152 |
| 5,743,616 A | | 4/1998 | Guiliano et al. ............. 362/31 |
| 5,772,311 A | | 6/1998 | Williams et al. ............ 362/238 |
| 5,887,856 A | | 3/1999 | Everly, II ................... 362/152 |

FOREIGN PATENT DOCUMENTS

| | | | | |
|---|---|---|---|---|
| CA | 740748 | * | 8/1966 | ................ 362/152 |
| FR | 1408085 | * | 6/1965 | ................ 362/152 |
| GB | 844581 | * | 8/1960 | ................ 362/152 |
| GB | 881445 | * | 11/1961 | ................ 362/146 |

* cited by examiner

Primary Examiner—Sandra O'Shea
Assistant Examiner—Peggy A Neils
(74) Attorney, Agent, or Firm—Fleshner & Kim, LLP

(57) ABSTRACT

An outdoor railing system includes a substantially waterproof illumination device mounted in a railing system for illuminating the railing. The illumination device could comprise a plurality of low voltage light bulbs which are spaced at intervals inside a substantially waterproof sheath. Railing systems embodying the invention could utilize pickets, or a plate of transparent material. If a plate of transparent material is used, designs can be etched into the plate, and light from an illumination device could scatter from the etching to provide an illuminated pattern.

17 Claims, 4 Drawing Sheets

ILLUMINATED EXTERIOR RAILING SYSTEMS

BACKGROUND OF THE INVENTION

1. Field of the Invention

The invention relates to hand railings. In particular, the invention relates to railing systems that are used on exterior decks and balconies.

2. Background of the Related Art

Currently, outdoor decks tend to have hand railings made from dimensional lumber. The railings are designed to prevent people from falling from the deck. Unfortunately, it is difficult to add lighting fixtures to the wooden railings, and any electrical wiring associated with such lighting fixtures is usually exposed to the elements.

Some existing exterior decks and balconies use metal railings. The metal railings are often painted to provide a good appearance, and to provide a level of water proofing.

SUMMARY OF THE INVENTION

The invention is an illuminated railing system which is intended to be used in outdoor applications. Railing systems embodying the invention can be used on outdoor decks made from dimensional lumber, or on outdoor decks and balconies made from metal and/or concrete.

A first illuminated railing system embodying the invention includes a plurality of support posts that can be attached to the base of the deck or balcony, and a top railing which is mounted on the support posts. An illuminating device is mounted within the top railing and is configured to illuminate portions of the railing system and/or the deck. The illuminating device may be a light tube that includes a plurality of light generating devices housed within a substantially waterproof sheath. Alternatively, the illuminating device could comprise a plurality of substantially waterproof light bulbs.

In a railing system embodying the invention, the top railing can be used to completely surround the illuminating device to provide a degree of weather protection. In addition, the illuminating device itself can be made so that it is substantially waterproof. These two features, together, provide an illuminated hand railing which is highly resistant to damage due to water or other forms of precipitation. In addition, in preferred embodiments of the invention, the structural support elements of the railing system are made from metallic materials, plastics or other molded or extruded materials that are also weather resistant.

Some embodiments of the invention may include a plurality of pickets which extend between the top railing and a base or a lower cross bar. Other embodiments of the invention can include a plate of transparent material that is attached between adjacent support posts.

Still other preferred embodiments of the invention can include upper and lower support bars that extend between adjacent support posts, and which are positioned below the top railing. Additional illuminating devices can then be mounted within the upper and lower support bars. Thus, a railing system embodying the invention can include additional light generating devices, one mounted in the top railing, one mounted in an upper support bar, and another mounted in a lower support bar.

In railing systems embodying the invention that include a plate of transparent material mounted between support posts, an illuminating device can be positioned so that it illuminates a top edge of the plate of transparent material. In this instance, if patterns are etched into the plate of transparent material, light from the illuminating device will be transmitted through the plate and will be scattered by the etchings. This can provide an illuminated pattern which appears on the face of the plate of transparent material.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

Preferred embodiments of the present invention will be described in conjunction with the following drawing figures, wherein like elements are referred to with like reference numbers, and wherein.

DETAILED DESCRIPTION OF PREFERRED EMBODIMENTS

A railing system embodying the invention can be used in interior or exterior applications. However, due to certain design features, a railing system embodying the invention is particularly well suited for outdoor applications, such as outdoor decks and balconies.

In the case of outdoor decks, the decks can be made of regular or pressure treated dimensional lumber. Outdoor balconies can include balconies formed of metal materials or combinations of metals, wood and/or concrete. In any event, railing systems embodying the invention are intended to be highly resistant to outdoor conditions such as sunlight, rain, snow, ice, and temperature fluctuations.

Figure 1:
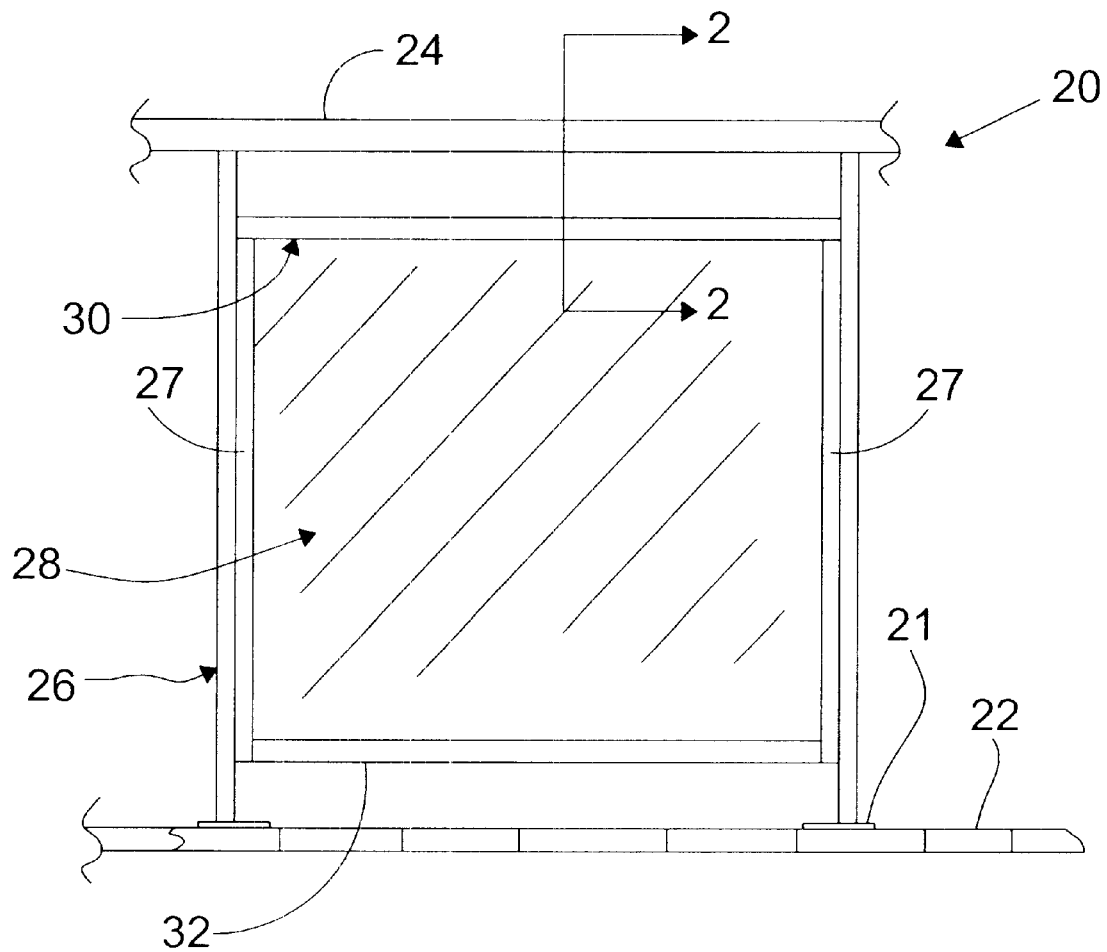
FIG. 1 is an elevation view of a railing system embodying the invention.

An elevation view of a first railing system embodying the invention is shown in FIG. 1. The railing system 20 is attached to the top surface of a deck 22. The deck 22 is made using a plurality of dimensional lumber planks.

The railing system includes a plurality of upright support posts 26 which can be attached to a top surface of the deck 22. Preferably, flanges 21 are formed on bottom ends of the upright support posts 26. The flanges 21 are then bolted to the deck 22. Various other methods of mounting a railing system could also be used. For instance, if the railing system is to be attached to a metal deck or balcony, the upright support posts 26 could be welded or bolted directly to structural elements of the deck or balcony. Also, instead of (or in addition to) attaching the upright support posts 26 to the deck or balcony, the support posts 26 could be attached to a wall of a building to which the deck or balcony is attached.

A railing 24 is then mounted at top ends of the support posts 26. In addition, the railing system 20 includes a lower support bar 32 and a upper support bar 30. In the particular embodiment shown in FIG. 1, a plate of transparent material 28 is mounted on the railing system between the support posts 26 and the upper and lower support bars 30, 32. Special flanges or attachment portions 27 may be formed on the support posts 26 to facilitate holding the plate of transparent material 28 in place.

An illuminating device is mounted either within the top railing 24, within the upper support bar 30, or within the lower support bar 32. Alternatively, illuminating devices could be mounted in the top railing 24, the upper support bar 30, and the lower support bar 32. Details showing how the illuminating devices and the plate of transparent material 28 are mounted are shown in FIG. 2, which is a cross-sectional view taken along section line 2—2 of FIG. 1.

Figure 2:
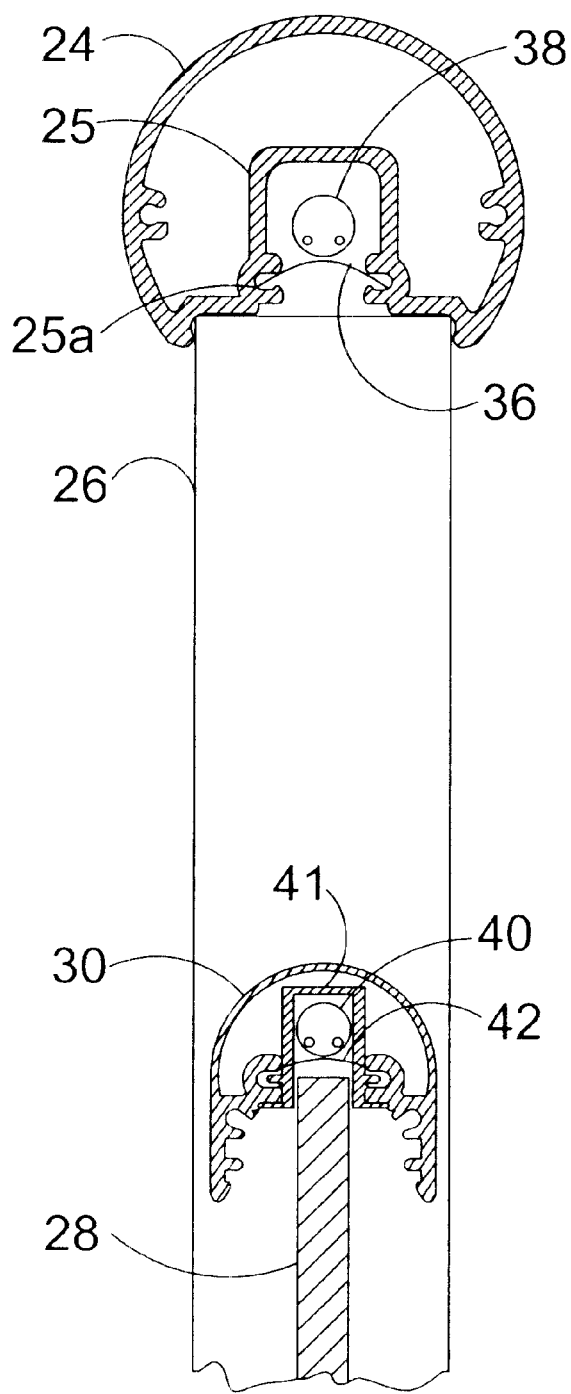
FIG. 2 is a cross-sectional view of a portion of the railing system shown in FIG. 1, taken along section line 2—2.

As shown in FIG. 2, the railing 24 is mounted at the top of the support post 26. The railing 24 includes an interior recess 25 for holding an illuminating device 38. The illuminating device 38 is held inside the recess 25 with a flexible, substantially transparent keeper member 36.

As also shown in FIG. 2, the upper support bar 30 is attached between adjacent support posts 26. The upper support bar 30 can include an integrally formed recess portion 41, or the recess portion 41 can be part of a separate piece which is then attached to the upper support bar 30. In the embodiment shown in FIG. 2, the recess portion 41 is formed separately from the upper support bar 30, and the recess portion 41 is then attached to the upper support bar 30.

In the embodiment shown in FIG. 2, the recess portion 41 is intended to hold both an illuminating device 40, and the upper edge of a transparent plate 28. A substantially transparent keeper member 42 holds the illuminating device at the upper end of the recess portion 41. The illuminating device 40 can then be used to illuminate the top edge of the transparent plate 28.

In some railing systems embodying the invention, a reflective coating may be formed on the interior surfaces of the recess 25 of the railing 24, and/or the recess portion 41 of the upper support bar 30. The reflective coatings would increase the lighting efficiency by ensuring that more of the light produced by the illuminating devices 38, 40 is projected out of the recesses.

Although the embodiment shown in FIG. 2 includes an illuminating device 38 in both the top railing and the upper support bar 30, particular embodiments of the invention could have an illuminating device in only the railing 24, or in only the upper support bar. Railing systems embodying the invention are custom tailored to meet customer demands.

Figure 7:
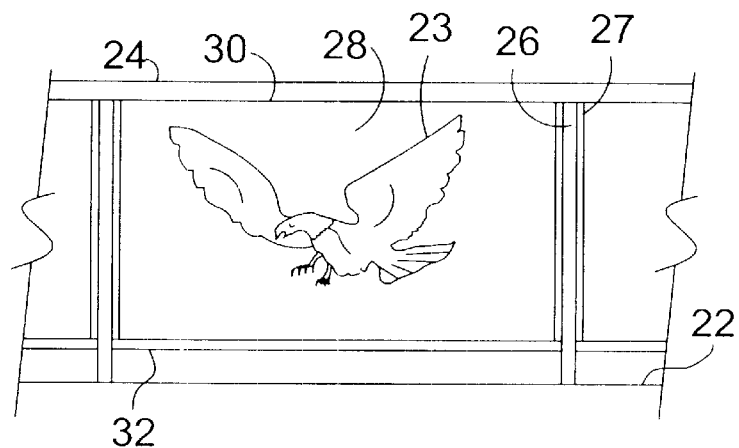
FIG. 7 is an elevation view of yet another railing system embodying the invention.

Furthermore, in a railing system embodying the invention that includes a plate of transparent material, the plate of transparent material may be positioned between upper and lower support bars, as shown in FIG. 1, or between a lower support bar 32 and a top railing 24 as shown in FIG. 7. In the embodiment shown in FIG. 7, no upper support bar is needed.

Regardless of whether a plate of transparent material 28 extends between a lower support bar 32 and a upper support bar 30, or extends all the way to the railing 24, the illuminating device positioned over the plate of transparent material 28 can be used to illuminate designs etched into the faces of the plate of transparent material 28. For instance, in the embodiment shown in FIG. 7, a design 23 has been etched into the plate of transparent material 28. An illuminating device 38 positioned within the railing 24 would illuminate a top edge of the plate of transparent material 28. The light would travel through the plate of transparent material 28, and would scatter from the etching lines of the design 23. This would create an effect whereby the etching lines of the design 23 are illuminated against a darker background of the non-etched portions of the plate of transparent material 28.

Embodiments of the invention could use glass, plexiglass, or other transparent materials to serve as the plate of transparent material 28. In addition, the transparent material can be substantially transparent, could be partially opaque, or could contain a tinting agent. Furthermore, one or both of the flat surfaces of the plate of transparent material 28 could contain coatings which filter the light passing through the plate, or which are designed to achieve various lighting or coloring effects.

Figure 3:
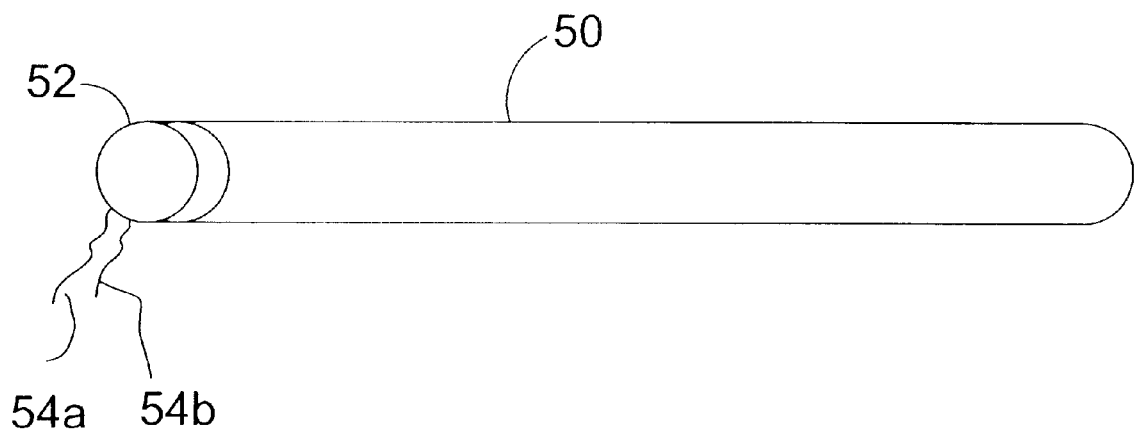
FIG. 3 is perspective view of a light tube which can be used in an embodiment of the invention.
Figure 4:
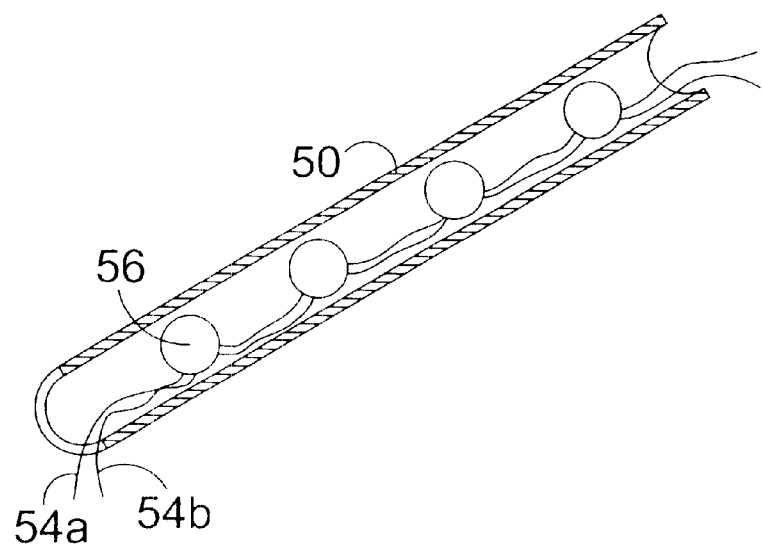
FIG. 4 is a sectional perspective view showing interior features of a light tube which can be used in an embodiment of the invention.

Details of an example of one type of illuminating device that can be used in a railing system embodying the invention are shown in FIGS. 3 and 4. As shown in FIG. 3, the illuminating device is a light tube 50 that has an end cap 52 which is used to substantially seal the tube 50. Two or more electrical lines 54a, 54b can penetrate the body of the tube 50, or the end cap 52, to provide electrical connections to lighting elements within the tube 50. As shown in FIG. 4, a plurality of light bulbs 56 can be spaced along the inside of the tube 50. The electrical lines 54a, 54b can then be connected to the light bulbs 56 in a parallel fashion.

A light tube as shown in FIGS. 3 and 4 allows light bulbs 56 which are not themselves waterproof, to be encased in a substantially waterproof sheath made of the tube 50 and the end cap 52. Because the sheath is substantially waterproof, it is suitable for use in outdoor applications. Preferred embodiments of the invention could use low voltage light bulbs 56, such as 12 volt light bulbs. This would allow the light tubes to be connected to common low power, low voltage electrical supply units which are used in many different outdoor lighting applications. Furthermore, low voltage light bulbs can be produced inexpensively in a wide variety of different configurations.

Also, the waterproof sheath 50 can be made of relatively inexpensive transparent plastics, vinyls or other resin materials. The material for the sheath 50 must be able to withstand any heat produced by the bulbs 56. Preferably, the sheath 50 should be flexible so that a light tube can be bent into different configurations. Also, the sheath material should be transparent so that light produced by the light bulbs is efficiently propagated from the sheath. The sheath may be tinted or colored to produce different desired lighting effects.

The result is an inexpensive, but waterproof light tube which can be bent to accommodate railing corners or angles, and which can be easily sized to a variety of different applications. For instance, light tubes used in railing systems embodying the invention can custom fabricated from long tubes which are coiled on spools. The coiled light tubes could be physically cut to accommodate the particular size of an outdoor railing system embodying the invention.

Alternate embodiments of the inventions could use a different type of illuminating device. For instance, the light tube shown in FIGS. 3 and 4 could be replaced with a fluorescent lighting device. The light tube could also be replaced with light bulbs that are themselves waterproof. In yet additional alternative embodiments, an electro-luminescent, chemi-luminescent or fluorescent lighting device could be employed.

Furthermore, if a railing system embodying the invention is used in an outdoor application, the illuminating devices used in the railing system could be powered with electricity generated by a solar collector. In such a system, a device for generating and storing electricity using solar power would be mounted in an unobtrusive location. The electricity stored by the solar generating device would then be used to power the illuminating device after sunset.

As shown in FIG. 2, an illuminating device 38 is held within a recess 25 of the railing 24 by a flexible keeper member 36. Similarly, the illuminating device 40 in the upper support bar 30 is held in the recess portion 41 by a flexible keeper member 42. The keeper members 36, 42 should be substantially transparent so that light produced by the illuminating devices can pass through the keeper members and illuminate lower portions of the railing, or a plate of transparent material positioned below the illuminating devices. The keeper members can be a long thin strip of flexible plastic. Any other material which is able to be easily positioned within the railing or upper support bar, and which will transmit a sufficient amount of light from the illuminating devices, could also be used. In addition, the keeper member itself could be colored or tinted to achieve different lighting effects.

The use of a flexible transparent keeper member allows the illuminating device to be laid into the recess 25 of the railing 24, or the recess portion 41 of the upper support bar 30, before the keeper member is installed. Once the illuminating device has been positioned within the appropriate recess, the flexible keeper member can simply be pressed into position.

Although the embodiment shown in FIG. 2 includes flexible keeper members to hold the illuminating devices in place within the recesses, a variety of other illuminating device mounting options could be used. For instance, the flexible keeper member could be replaced with a rigid window of transparent material. In other embodiments of the invention, the upper railing 24 and/or the upper support bar 30 could be configured such that a hollow, elongated cavity for holding the illuminating device is formed in the railing/support bar. A bottom aperture of the cavity could have a width dimension smaller than the diameter of the illuminating device, so that the illuminating device is held within the railing/support bar. The bottom aperture would, nonetheless, allow light from the illuminating device to illuminate the railing and/or a plate of transparent material.

Because the illuminating devices 38, 40 are positioned within recesses inside the railing 24 or upper support bar 30, water is unlikely to enter the recesses and reach the illuminating devices. However, because the illuminating devices are formed with a substantially waterproof sheath, any water that does collect in the recesses should not effect the devices.

Figure 5:
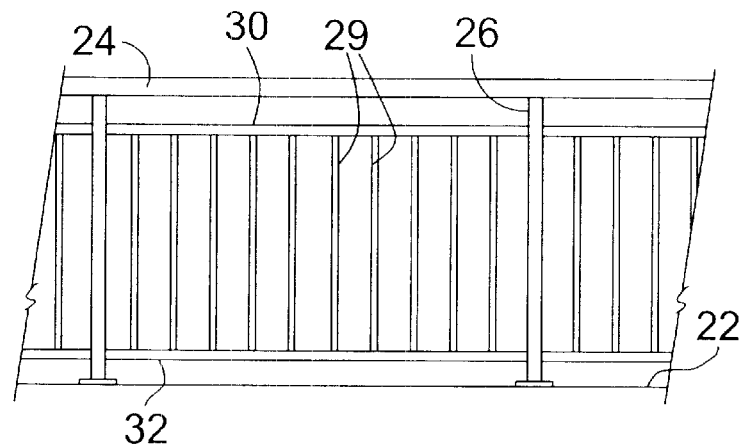
FIG. 5 is an elevation view of another railing system embodying the invention.

Alternate railing systems embodying the invention could use pickets 29 in place of the plate of substantially transparent material. In the embodiment shown in FIG. 5, a plurality of pickets 29 are positioned between a lower support bar 32 and an upper support bar 30. In this embodiment, illuminating devices could be positioned in either the top railing 24, the upper support bar 30, the lower support bar 32, or all of these locations.

Figure 6:
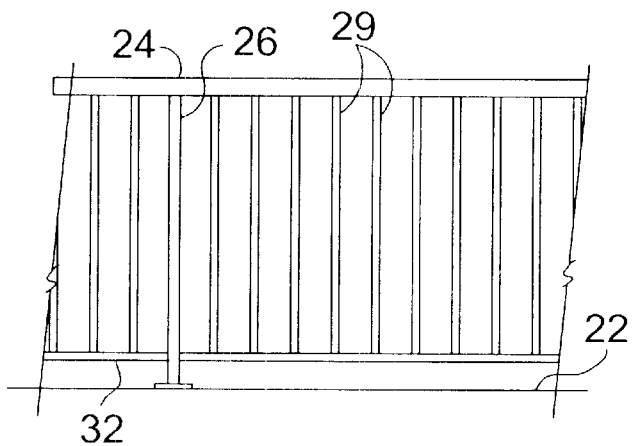
FIG. 6 is an elevation view of another railing system embodying the invention.

In the embodiment shown in FIG. 6, a plurality of pickets 29 extend between a lower support bar 32 and the railing 24. In this embodiment, a lighting device would be installed in the railing 24 and/or the lower support bar 32.

The foregoing embodiments are merely exemplary and are not to be construed as limiting the present invention. The present teaching can be readily applied to other types of apparatus. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although an incandescent light bulb and a fluorescent light bulb may not be structural equivalents in that the incandescent light bulb uses a filament to produce light whereas the fluorescent light bulb relies on a glowing gas to produce light, in the environment of illuminating devices, an incandescent light bulb and a fluorescent light bulb may be equivalent structures.

What is claimed is:

1. An outdoor railing system, comprising:
   a plurality of support posts;
   an upper railing mounted on the support posts;
   a plate of substantially transparent material that is mounted between adjacent support posts;
   an upper support bar that is attached between adjacent support posts;
   a first lighting device mounted in the upper support bar such that light from the first lighting device illuminates an upper edge of the plate of substantially transparent material; and
   a second lighting device that is mounted in the upper railing.

2. The system of claim 1, further comprising:
   a lower support bar that is attached between an adjacent pair of support posts.

3. The system of claim 2, wherein the plate of substantially transparent material is attached between the upper support bar and the lower support bar.

4. The system of claim 1, wherein a recess is formed in the upper support bar, and wherein the first lighting device is mounted in the recess.

5. The system of claim 4, further comprising a keeper member that holds the first lighting device in the recess formed in the upper support bar, wherein the keeper member can be pressed into position in the recess by hand.

6. The system of claim 3, wherein a pattern is etched in the plate of substantially transparent material, and wherein light from the first lighting device is scattered from the etched pattern.

7. The system of claim 1, wherein a recess is formed in the railing, and wherein the second lighting device is mounted in the recess.

8. The system of claim 7, further comprising a keeper member that holds the second lighting device in the railing, and wherein the keeper member can be pressed into position in the recess by hand.

9. An outdoor railing system, comprising:
   a plurality of support posts;
   a railing mounted on the support posts;
   an upper support bar attached between an adjacent pair of support posts;
   a lower support bat attached between the adjacent pair of support posts;
   a plate of substantially transparent material that is mounted between the upper support bar and the lower support bar, wherein a pattern is etched in the plate of substantially transparent material;
   a first illumination means for illuminating a top edge of the plate of substantially transparent material; and a second illumination means for illuminating the railing system disposed above said first illumination means.

10. The system of claim 9, wherein at least one of said first and second illumination means comprises:

a plurality of light generating devices, and a substantially waterproof sheath that houses the light generating devices.

11. The system of claim 9, wherein the upper support bar and the first illumination means are configured such that light from the first illumination means is conducted to and scatters from the pattern in the plate of substantially transparent material.

12. The system of claim 9, wherein the support posts, the railing, the upper support bar and the lower support bar are constructed from aluminum.

13. The system of claim 9, wherein the support posts and the railing are constructed from a molded resin.

14. The system of claim 9, wherein a recess is formed in the upper support bar, and wherein the first illumination means is mounted in the recess.

15. The system of claim 14, further comprising a keeper member, mounted in the recess, wherein the keeper member is configured to hold the first illumination means in the recess.

16. The system of claim 15, wherein the upper support bar and the keeper member are configured such that the keeper member can be pressed into position in the upper support bar by hand.

17. The system of claim 1, wherein at least one of said first and second lighting devices includes:

a plurality of light generating devices, and a substantially waterproof sheath that houses the light generating devices.

* * * * *